United States Patent [19]

Wengryn et al.

[11] 4,129,187
[45] Dec. 12, 1978

[54] ELECTRO-MECHANICAL VIBRATOR

[75] Inventors: Michael Wengryn, Nashua; Alexander Khazan, Manchester, both of N.H.

[73] Assignee: Sun Chemical Corporation, New York, N.Y.

[21] Appl. No.: 864,273

[22] Filed: Dec. 27, 1977

[51] Int. Cl.² ............................................. B25D 9/00
[52] U.S. Cl. ..................................... 173/117; 310/30; 366/600; 335/229
[58] Field of Search ................. 173/100, 117; 310/15, 310/30; 335/229, 231, 235; 366/127, 600

[56] References Cited

U.S. PATENT DOCUMENTS

| | | | |
|---|---|---|---|
| 3,736,448 | 5/1973 | Hebel et al. | 310/30 |
| 3,772,540 | 11/1973 | Benson | 310/30 |
| 3,863,114 | 1/1975 | De Mayo | 310/29 |
| 3,870,103 | 3/1975 | Abel | 173/100 |
| 3,878,412 | 4/1975 | Kurpanek | 173/117 |
| 3,984,707 | 10/1976 | McClintock | 310/30 |

Primary Examiner—Robert A. Hafer
Attorney, Agent, or Firm—Cynthia Berlow

[57] ABSTRACT

A mechanical vibrator or tapper is shown in which a high intensity permanent magnet armature moves within the field of a coil of wire wound about the magnet. The magnet is guided for reciprocal motion within a spool containing the winding and strikes impact pads at opposite ends of the central spool opening. The magnet consists of two permanent magnets bonded to one another with like poles facing one another and is freely movable within the spool opening and is guided therein. A permanent magnet is fixed at one end of the spool opening and forces the permanent magnet assembly to reverse its motion after the magnet field of the winding drives the armature magnet against the impact pad at that end of the spool opening, and the magnetic field of the coil goes to zero. An oscillator circuit for driving the system is contained on printed circuit boards mounted within the housing which encloses the vibrator structure. The housing is crimped together in its final assembly.

11 Claims, 7 Drawing Figures

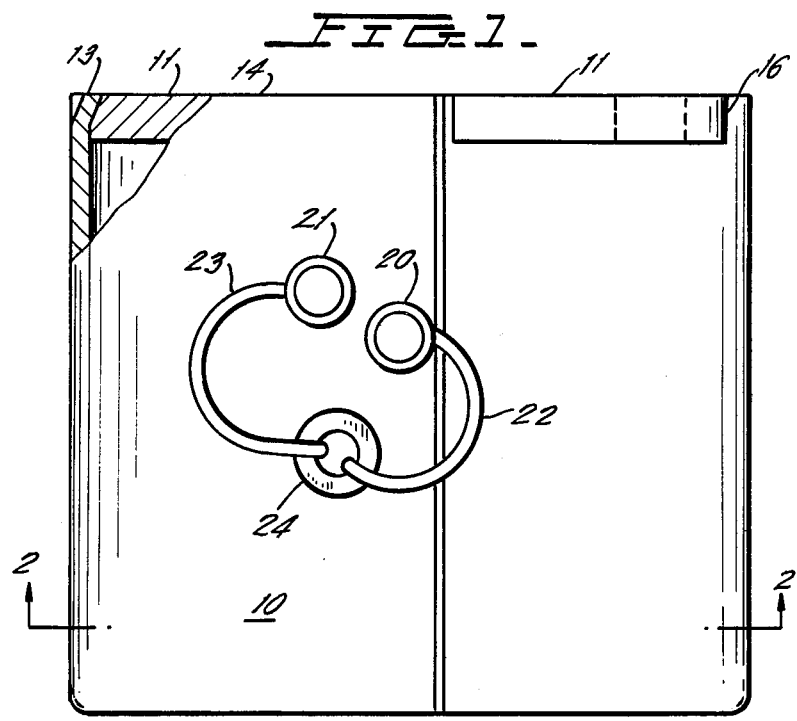
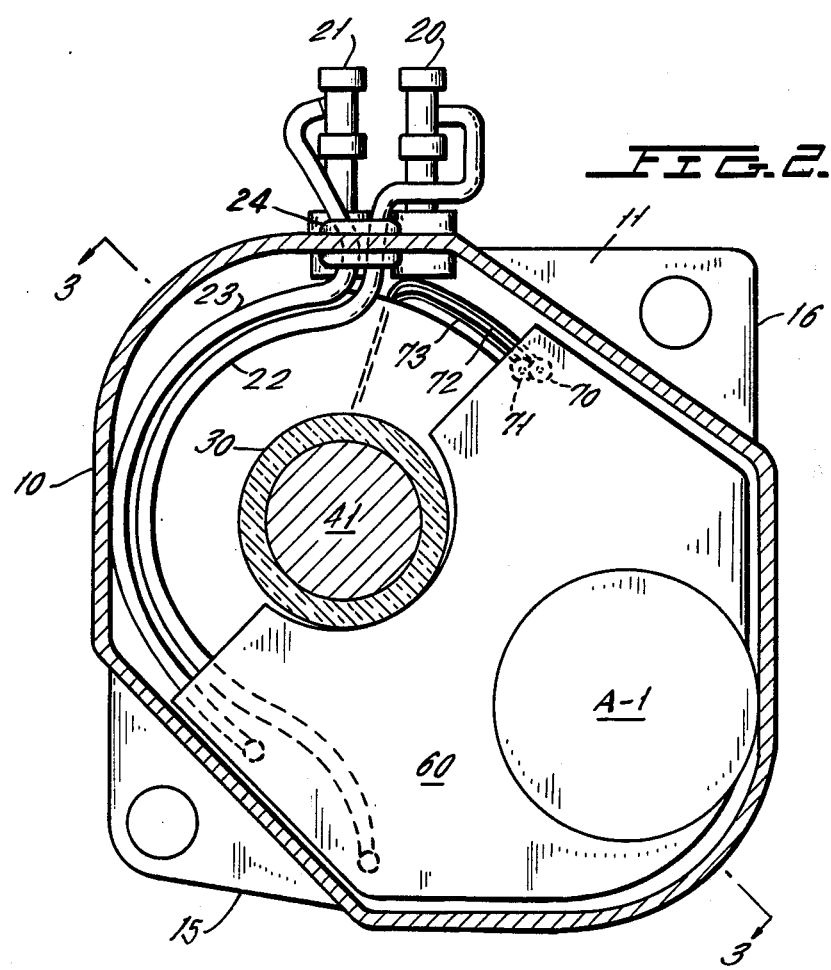

ELECTRO-MECHANICAL VIBRATOR

BACKGROUND OF THE INVENTION

This invention relates to vibrator structures, and more specifically relates to a novel electro-mechanical vibrator which can be connected to a mechanism containing a mechanical movement which will have its friction reduced by applying low periodic shock forces to the movement.

Vibrator structures or tappers are well known for use in connection with highly accurate and sensitive indicators including air data instruments such as altimeters, air speed indicators, rate of climb indicators, and the like. Typical vibrator structures for this purpose known as "tapping" devices are shown in U.S. Pat. No. 3,507,339 in the name of De Mayo, U.S. Pat. No. 3,863,114 in the name of De Mayo, and U.S. Pat. No. 3,870,103 in the name of Abel. These devices typically are relay-type vibrators and operate in the manner of a variable reluctance motor. Thus, the devices require soft magnetic material to direct the flux generated by a coil into the working air gap of the motor. This causes the armature of the motor, which carries a small hammer, to strike a hard rubber pad fixed to the housing of the device during each cycle of ocillation, thus inducing vibration required for reducing the friction of the mechanism to which the vibrator is connected.

Since the force exerted on the armature of the prior art device can be only in the direction to close the magnetic gap, the devices generally use a spring to open the gap to complete a cycle of operation.

The foregoing vibrator devices are relatively expensive to manufacture and require calibration and adjustment after assembly. The need for a mechanical spring to return the armature to its cyclic-starting position is a source of possible failure and the device characteristics are subject to change during aging and ambient temperature variations. It has also been found that there is wear of the parts due to friction between the movable armature and its guide.

BRIEF DESCRIPTION OF THE PRESENT INVENTION

In accordance with the present invention, a novel vibrator is provided wherein armature movement is caused by the interaction of the field of a high intensity permanent magnet armature with the field of an energized coil of wire wound about the magnet. The permanent magnet is preferably a high energy magnet, such as a rare earth cobalt magnet, and the magnet also serves as the hammer of the vibrator and strikes an impact pad at one end of the path of motion taken by the magnet during each cycle of operation. No magnetic material other than the armature is used, in accordance with the present invention, to contain or direct the field of the coil.

A small chip of permanent magnetic material, which may also be a rare earth cobalt magnet, is positioned at one end of the vibrator assembly to apply a repulsion return force to the permanent magnet armature after the permanent magnet has moved toward the chip and impacted on a pad adjacent to the chip.

Preferably the permanent magnet armature consists of two permanent magnets which are bonded in abutting relationship to one another with like poles facing one another.

Magnetic circuits of this general type have been used in connection with linearly acting transducers as is shown in U.S. Pat. No. 3,504,320 in the name of Engdahl et al. However, this patent does not disclose the use of an arrangement for a vibrator or tapper device and does not provide the single drive coil and directly abutting magnet structures of the present invention.

The present invention provides numerous advantages over vibrators of the prior art, as follows:

1. The vibrator lends itself to low cost production techniques;
2. No adjustment or calibration is required after assembly;
3. No mechanical spring is necessary for returning the armature to its starting position, thereby increasing the reliability of the vibrator and producing more consistent performance;
4. The motor efficiency is increased, thus reducing the vibrator power consumption and heat rise;
5. The vibrator characteristics do not change with age;
6. Very little wear occurs since the armature tends to float, magnetically, in the center of the coil, thus reducing friction between the moving armature and the stationary guide structure during coil excitation.

BRIEF DESCRIPTION OF THE DRAWINGS

FIG. 1 is a top view of the housing containing the vibrator of the present invention.

FIG. 2 is a cross-sectional view of the housing of FIG. 1 taken across the section line 2—2 in FIG. 1.

DETAILED DESCRIPTION OF THE DRAWINGS

Figure 3:
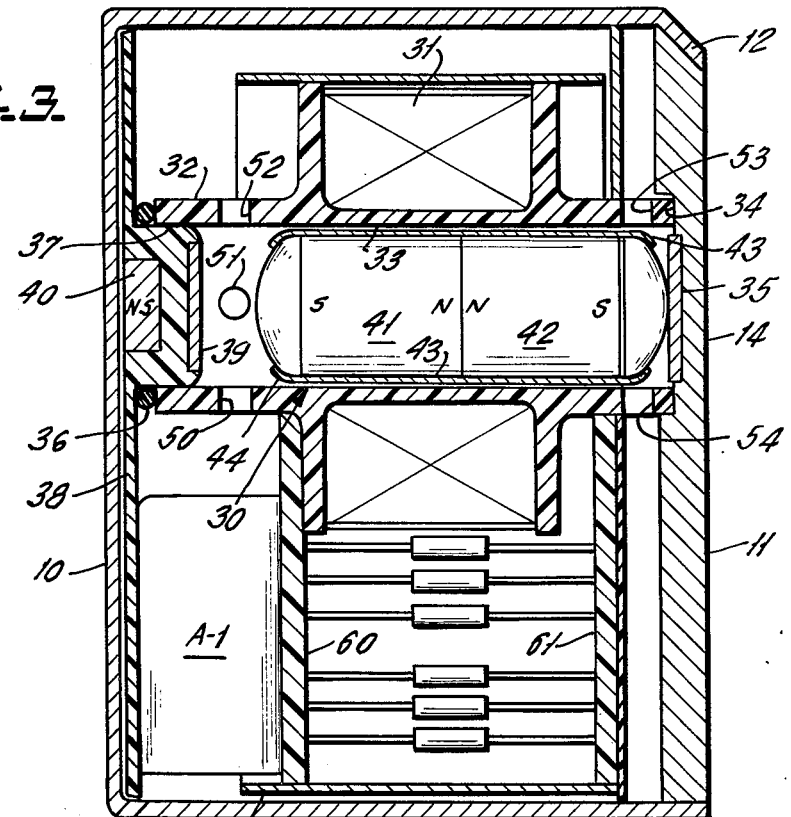
FIG. 3 is a cross-sectional view of FIG. 2 taken across the section line 3—3 in FIG. 2.

Referring first to FIGS. 1, 2, and 3, there is shown therein the outer housing 10 which encloses the vibrator structure and which fits against a flat base 11. Housing 10 and base 11 may be of non-magnetic metallic material and may be connected by crimping the housing 10, for example at crimp regions 12 and 13 (FIGS. 3 and 1, respectively), and by cementing the two. Housing 10 may be a thin sheet nonmagnetic metal and base 11 may be a somewhat thicker nonmagnetic metal whose outer surface 14 (FIGS. 1 and 3) is kept as flat as possible. The vibrator assembly may then be clamped to a mechanism such as an altimeter or the like by bolts which extend through exposed ears 15 and 16 (FIG. 2) in the base 11 in order to clamp the surface 14 of the base 11 against the instrument.

Two terminals 20 and 21 extend through the housing 10 for connection to a suitable voltage source as will be discussed. Wires 22 and 23 extend from terminals 20 and 21 and through a seal 24 to bring power into the interior of the housing 10 which contains the drive electronics.

The interior of the housing 10 then contains a circular spool 30 which may be of a molded plastic material. The spool 30 carries an electrical winding 31 of suitable number of turns and wire size. The spool 30 also contains an integral central tube member 32 having a central axial opening 33.

One end of tube 32 is fitted within a circular depression 34 in the base 14 as shown in FIG. 3. Note that the central depression 34 in the base 14 also contains a hard rubber pad 35 which will serve as one impact pad for the vibrator as will be later seen.

The opposite end of the tube 33 is fitted against a compression ring 36 which is carried on an extension 37 of insulation plate 38 which is fitted against the inside of cover 10. Tube 32 telescopes over extension 37 and compresses the ring 36 to insure that the circular spool 30 is suitably held within the casing.

Extension 37 has a second hard rubber impact pad 39 thereon and further receives the permanent magnet chip 40 which may be a high energy magnet made, for example, of a rare earth cobalt. Magnet 39 is permanently magnetized in the direction of the axis of opening 33 and has its north and south poles arranged as illustrated.

A permanent magnet armature assembly consisting of two permanent magnets 41 and 42 is slidably contained within the central opening 33 where the magnets 41 and 42 are cylindrical in configuration. Magnets 41 and 42 are preferably also high energy magnets and may also be rare earth cobalt magnets. Each of magnets 41 and 42 are permanently magnetized in a direction along the axis of opening 33 and have their north and south poles arranged as indicated where like poles of the two magnets are directly abutted against one another. In the illustration of FIG. 3, the north poles of magnets 41 and 42 are abutted against one another.

The two magnets 41 and 42 are fixed as a single assembly by fitting them within non-magnetic sleeve 43 which has its ends 44 and 45 crimped around the end surface of magnets 41 and 42, respectively, so that the entire magnet assembly will move as a unit. A plurality of openings such as openings 50 to 54 are formed in the tube portion 32 of spool 30 so that air contained within opening 33 can vent out of the tube area as the permanent magnets 41 and 42 move axially within the tube.

As will be later described, suitable electronics supply current to coil 31 in order to cause the permanent magnet structure 41-42 to oscillate within opening 33 and to strike the pads 39 and 35 during its oscillation to produce the shock or vibration, or so-called "tapping", which is the purpose of the device when coupled to another instrument such as an altimeter.

Figures 5, 6, 7:
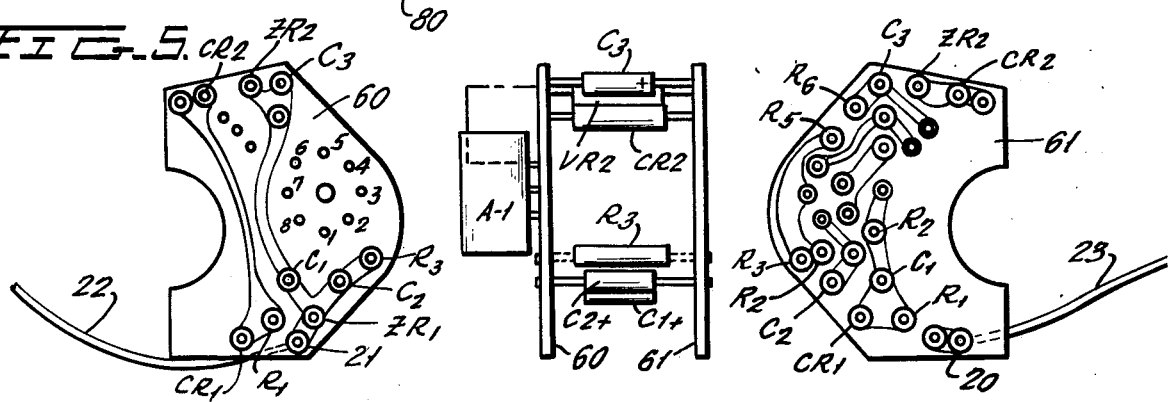
FIG. 5 is a plan view of one of the circuit boards which contains a portion of the circuit of FIG. 4.
FIG. 6 is a plan view of a second circuit board which contains a portion of the circuit of FIG. 4.
FIG. 7 is an end view illustrating the interconnection of the circuit boards of FIGS. 5 and 6.

The necessary electronics for drive coil 31 is mounted on and between the two circuit boards 60 and 61 which are shown in more detail in FIGS. 5, 6, and 7. These two circuit boards, as shown in FIG. 7, are interconnected with one another through the connection of various discrete components to define the circuit shown in FIG. 4.

Figure 4:
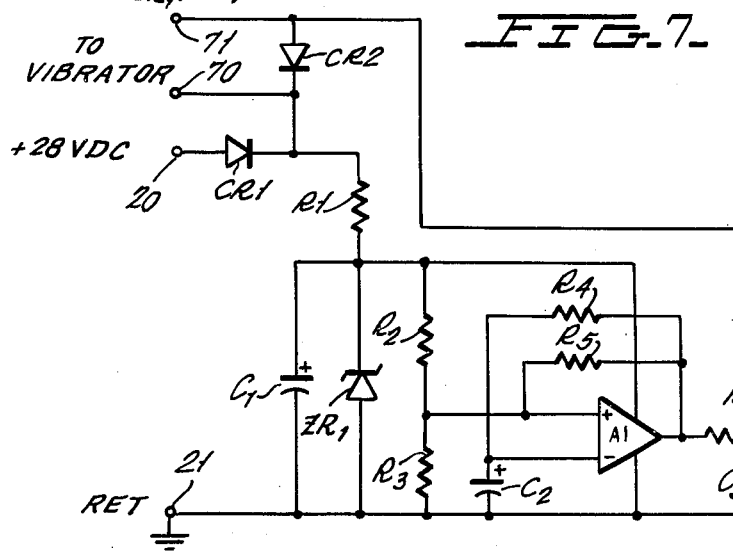
FIG. 4 is a schematic diagram of one circuit which can be used to drive the vibrator of FIGS. 1, 2 and 3 and which is contained within the housing of FIGS. 1, 2 and 3.

FIG. 4 shows one typical circuit which may be used to drive coil 31, although it will be understood that any desired number of circuits could have been used. The particular circuit of FIG. 4 will produce an output current pulse at a frequency of from 20 to 40 Hertz where the current is "on" for approximately one-half the cycle and at zero for the remainder of the cycle.

The circuit shown in FIG. 4 is adapted to be driven by a d-c voltage source, which can be a 28 volt source which is connected to terminal pins 20 and 21 as shown in FIGS. 1, 2, and 4. The circuit has output terminals 70 and 71 which are connected to the winding 31 as schematically illustrated in FIG. 2 by the leads 72 and 73, respectively, which extend toward the spool 30.

In the circuit of FIG. 4, the positive terminal 20 is connected to a diode CR1 and then to resistor R1. Three parallel circuits are then formed of capacitor C1, zener diode ZR1, and the resistive divider R2-R3. An operational amplifier A1 is then provided and has its terminal 2 connected to the top of capacitor C2 and its terminal 3 connected to the junction between resistors R2 and R3. Feedback resistors R4 and R5 are also provided as shown. An output resistor R6 is then connected to capacitor C3 and to the base of transistor Q1. The emitter-collector circuit of transistor Q1 is connected and parallel with a zener diode ZR2. Resistor R4 and capacitor C2 define a timing circuit which controls the turn on and turn off times of the transistor Q1, thereby controlling the application of current to the coil 31 through terminals 70 and 71 at the desired frequency. A diode CR2 is connected across terminals 70 and 71 to permit a rapid decrease in voltage across coil 31 when the transistor Q1 turns off.

The various components in the circuit of FIG. 4 are mounted on the circuit boards 60 and 61 in FIGS. 5 and 6 as illustrated, and certain of the discrete components are connected between the boards as illustrated in FIG. 7. The operational amplifier A1 is carried on board 60 as shown in FIG. 7.

The assembled circuit of FIG. 7 is then contained in the housing of FIG. 3 as shown in FIG. 3. The entire assembly including the spool 30 and the circuit boards 60 and 61 may be covered by a cylindrical tape or the like shown as cylindrical tape 80 in FIG. 3.

It is now possible to describe the operation of the vibrator of FIG. 3. Assuming that a current pulse is supplied to the coil 31 by the electronics of FIG. 4, the magnetic field produced by coil 31 interacts with the magnetic field of permanent magnets 41 and 42 to rapidly propel the magnet assembly to the left in FIG. 3 and to cause the magnet 41 to impact against pad 39. This will produce a mechanical shock impulse which is transferred to the base 11 and then to the instrument to which the vibrator is attached. After striking pad 39, the current in coil 31 decreases to zero and the small permanent magnet 40 exerts a sufficient repulsive force against magnet 41 to propel the assembly of magnets 41 and 42 to the right, causing the end of magnet 42 to strike the pad 35 thus to produce a still further shock.

The moveable magnetic armature consisting of magnets 41 and 42 is now in position where it will be rapidly propelled to the left when current flows in the winding 31 in the next cycle.

The cylindrical portion 32 of the spool 30 is provided with a sufficient number of openings to permit equalization of air pressure in front of and behind the armature as it travels to prevent compression of air from interfering with the operation of the vibrator. The structure of FIG. 3 operates in a highly efficient manner and the armature, consisting of magnets 41 and 42, may oscillate at a frequency of from 20 to 40 hertz. If desired, the frequency of operation may be selected to be at the resonant frequency of the magnets 41-42.

The floating action of the axial symmetric magnetic field created by the excited coil 31 floats the armature 41-42 and this tends to reduce armature friction and wear of the spool 30 and armature sleeve 43. The design is such that precision mechanical manufacturing tolerances and fits are not required in the fabrication of the vibrator.

Although a preferred embodiment of this invention has been described, many variations and modifications will now be apparent to those skilled in the art, and it is preferred therefore that the instant invention be limited not by the specific disclosure herein but only by the appended claims.

We claim:

1. An electro-mechanical vibrator for decreasing the friction of a mechanical movement comprising, in combination:

a non-magnetic support spool having a central axial opening;

a winding wound around said spool;

first and second permanent magnets disposed within said central axial opening and being closely fitted within said opening to be freely movable therein and being guided by said central opening, said first and second permanent magnets being permanently magnetized in the direction of the axis of said central axial opening and being held together with like poles facing one another;

said central axial opening having an axial length which is greater than the combined axial length of said first and second permanent magnets;

impact means disposed at at least one of the opposite ends of said central axial opening, the free end of said first permanent magnet being movable to a position to strike the surface of said impact means to induce a mechanical shock;

electrical circuit means connected to said winding to cause current flow therein which causes said first and second permanent magnets to move at least toward said impact means and toward a first of said opposite ends of said central opening;

and return means connected in said central opening for causing said first and second permanent magnets to move away from said first end of said central opening and toward the opposite end of said central opening, after said first permanent magnet strikes said impact means.

2. The vibrator of claim 1 which further includes a housing for enclosing said spool, winding, first and second permanent magnets, impact means, and return means; said housing including mounting means for connection of said housing to mechanical devices; said mechanical shock produced when said impact means is impacted being transmitted to said housing 3. The vibrator of claim 2 wherein said electrical circuit means is contained within said housing.

4. The vibrator of claim 1 wherein said first and second permanent magnets are high energy magnets and are cylindrical in cross-section.

5. The vibrator of claim 1 wherein said first and second permanent magnets are fixed together as a unit by an outer elongated sleeve which is crimped over the outer ends of said permanent magnets.

6. The vibrator of claim 4 wherein said first and second permanent magnets are fixed together as a unit by an outer elongated sleeve which is crimped over the outer ends of said permanent magnets.

7. The vibrator of claim 1 wherein the ends of said central opening are closed and wherein said central axial opening has a plurality of openings in the wall thereof to permit the relative free displacement of air from said central opening as said first and second permanent magnets move within said central opening.

8. The vibrator of claim 1 wherein said return means is a fixed permanent magnet which has a polarity at its surface facing said first permanent magnet of the same polarity as that of the free end of said first permanent magnet.

9. The vibrator of claim 1 wherein said return means permanent magnet is a high energy magnet.

10. The vibrator of claim 9 wherein said first and second permanent magnets are high energy magnets and are cylindrical in cross-section.

11. The vibrator of claim 1 wherein said opposite end of said central opening contains a striking pad means which is struck by the free end of said second permanent magnet where said second magnet is moved by said return means.

* * * * *